UNITED STATES PATENT OFFICE 2,528,384

DEPOSITION OF MATERIALS BY SEDIMENTATION

Arthur George Mitchell, London, England, assignor to A. C. Cossor Limited, London, England, a British company No Drawing. Application March 12, 1945, Serial No. 582,403. In Great Britain March 30, 1944

7 Claims. (Cl. 117—33.5)

This invention relates to the formation by a sedimentation process, of adherent films of powders which are insoluble, or only slightly soluble, in water. It is particularly applicable to the deposition of such films on glass supports or foundations, and especially for the preparation of fluorescent screens for X-ray or cathode-ray apparatus. It may, for example, be applied to the deposition of fluorescent powders such as the sulphides, silicates, phosphates, oxides, or tungstates of zinc, cadmium, beryllium or magnesium.

In carrying the invention into effect, a binder film is first deposited by sedimentation from a suspension of a water-insoluble, or only slightly water-soluble, powder, in a slightly alkaline solution over-saturated with an inorganic substance which has very low solubility in water and which forms a gelatinous precipitate. Upon this film, the principal powder is subsequently deposited by sedimentation from a suspension.

The said inorganic substance is preferably a hydroxide, e. g. aluminium hydroxide. The over-saturated solution may be formed by mixing a slightly alkaline solution with a dilute solution of a soluble salt from which the said inorganic substance will be formed, e. g. of aluminium sulphate. The solutions should be so dilute that no visible precipitate is formed, but of such concentration that the mixed solution will be over-saturated; this is to say, that the said inorganic substance is in a supersaturated or colloidal solution. The concentration of the said inorganic substance may be of the order of one part per million.

The powder for the binder film is introduced into the solution in the form of an aqueous suspension. It is dispersed by shaking the mixture. The conductivities of the solutions are so selected that the particles of this powder will remain dispersed.

The mixture is allowed to stand for a period, usually of some hours. A film is formed on the foundation by settling of the powder from the mixture. This film now serves as a binder film for the fluorescent powder, or other further powder, a film of which is to be produced. This further powder is susequently introduced into and dispersed through the liquid, and the mixture is again allowed to stand for a period, so that the further powder will settle on the binder film already formed. When the liquid has been removed, for example by pouring off, the remaining film will by the foregoing process be rendered consistently adherent, and may be made permanent by drying by a known method.

An example of the formation of a fluorescent screen for a cathode ray tube by the method according to the invention will now be described.

Two solutions are mixed to form the bulk liquid, which is placed in the tube to cover the surface on which the screen is to be deposited. These solutions may be mixed before pouring into the tube or they may be poured in successively in either order.

One of these solutions is a very dilute solution of aluminium sulphate in distilled water and contains about one part of aluminium per million. The distilled water for making this solution must not have a comparable content of any element which will form an insoluble compound when mixed with alkali. It may have a conductivity not greater than about $18 \times 10^{-6}$ mhos per centimetre cube, at 18° C., but preferably this should be about $6 \times 10^{-6}$.

Of this very dilute solution of aluminium sulphate, 300 ccs. are poured into the cathode ray tube.

The other solution is a very dilute solution of caustic soda in tap water, the concentration of caustic soda being, for example, about 0.0025 gm./litre. The conductivity of the tap water may be of the order of $520 \times 10^{-6}$.

Of this very dilute solution of caustic soda, 200 ccs. are poured into the cathode ray tube.

The conductivity of the bulk liquid, being the mixture of these two solutions in the cathode ray tube, may be about $180 \times 10^{-6}$, or other value between the limits $260 \times 10^{-6}$ and $140 \times 10^{-6}$.

An aqueous suspension of the powder to be used in the binder film, say alumina, is prepared, containing particles of sizes ranging from ½ to 1 micron. The quantity of this suspension necessary to provide on the screen area a deposit of about 0.05 mgm./cm.$^2$ is poured into the bulk liquid in the cathode ray tube. The mixture is next agitated, and then left for about 8 hours for the powder to settle. It is believed that a coating of aluminium hydroxide, coming from the solution, is gradually formed around the particles of alumina at the same time as the settling proceeds. A film is thus formed which will serve as binder to particles of fluorescent powder subsequently to be settled thereon.

The fluorescent powder, which may for example be zinc sulphide or zinc fluoride, and which may have particle sizes up to the order of 10 microns, is made up into a suspension in water. To assist in making this suspension, a dispersing agent, such as a 1% w/v solution of sodium hexametaphosphate, may be added to the water, in a proportion of, say, 1 cc. to 25 ccs. of water, to take 1 gm. of powder. A quantity of this suspension sufficient to produce on the screen area a layer of desired thickness, say, 0.5 mgm./cm.$^2$, is introduced into the bulk liquid in the cathode ray tube through a jet designed to disperse it evenly through the liquid. The mixture is then left for a period of, say, half an hour for the particles of fluorescent powder to settle. The liquid may now be poured off and the screen, when dried, is ready for use.

The function of the tap water, which is essentially a very dilute solution of alkaline carbonate, is to give an appropriate conductivity to the bulk liquid to keep the particles of luminescent powder dispersed. A special solution may be prepared for this purpose and substituted for the tap water.

In the place of aluminium hydroxide, other insoluble inorganic hydroxides may be used, such as those of zinc, copper or other metals. These hydroxides form gelatinous precipitates. Alternatively, silica or an insoluble inorganic basic carbonate may be used. In all of these cases some soluble compound of the desired element is substituted for the aluminium sulphate in the preparation of the bulk liquid.

In place of the alumina powder, other substantially water-insoluble inorganic powders, preferably colourless, may be used; for example, metallic oxides such as zinc or magnesium oxide, or silica.

I claim:

1. The method of forming a fluorescent screen as an adherent coating of a substantially water insoluble fluorescent powder upon a foundation which comprises covering said foundation with a slightly alkaline aqueous solution oversaturated with an hydroxide of one of the metals selected from the group consisting of aluminum, zinc and copper and having the properties of very low solubility in water and of forming a gelatinous precipitate in coming out of solution, said solution also containing a dispersion of a powdered oxide selected from the group consisting of aluminum oxide, zinc oxide, magnesium oxide and silicon oxide, allowing the solution to remain at rest whereby a binder film of gelatinous precipitate is formed on said foundation, dispersing in the remaining solution an aqueous suspension of said insoluble fluorescent powder, allowing said remaining solution to remain at rest whereby said insoluble fluorescent powder settles out to form a screen on said binder film, removing the remaining liquid and drying said screen.

2. The method according to claim 1 wherein the powdered oxide for the binder film is alumina.

3. The method according to claim 1 wherein the water insoluble fluorescent powder is zinc fluoride.

4. The method according to claim 1 wherein the water insoluble fluorescent powder is zinc sulphide.

5. The method according to claim 1 wherein the solution in which the powdered oxide for the binder is suspended comprises a mixture of a slightly alkaline solution and a dilute solution of aluminum sulphate.

6. The method according to claim 1 wherein said water insoluble fluorescent powder is cadmium tungstate.

7. The method of forming upon a surface an adherent film of a substantially water insoluble fluorescent powder which consists in suspending in a slightly alkaline aqueous solution oversaturated with an hydroxide of one of the metals selected from the group consisting of aluminum, zinc and copper, a water insoluble binder powder selected from the group consisting of aluminum oxide, zinc oxide, magnesium oxide and silicon oxide, covering said surface with said suspension and allowing a binder film of gelatinous precipitate to form on said surface, and subsequently dispersing said water insoluble fluorescent powder through the remaining solution and permitting said fluorescent powder to settle upon said binder film from said solution.

ARTHUR GEORGE MITCHELL.

REFERENCES CITED

The following references are of record in the file of this patent:

UNITED STATES PATENTS

| Number | Name | Date |
|---|---|---|
| 2,250,189 | Bachman | July 22, 1941 |
| 2,278,742 | Scott et al. | Apr. 7, 1942 |
| 2,328,292 | Painter | Aug. 31, 1943 |
| 2,376,437 | Severenz | May 22, 1945 |